(12) United States Patent
Jensen et al.

(10) Patent No.: US 6,772,488 B1
(45) Date of Patent: Aug. 10, 2004

(54) WIRE SPRING LATCH SAFETY HOOK

(76) Inventors: Robert D. Jensen, 222 E. King St., Winona, MN (US) 55987; Eric J. Pawlowski, 5034 7th St., Winona, MN (US) 55987

( * ) Notice: Subject to any disclaimer, the term of this patent is extended or adjusted under 35 U.S.C. 154(b) by 0 days.

(21) Appl. No.: 10/268,539

(22) Filed: Oct. 10, 2002

Related U.S. Application Data

(60) Provisional application No. 60/329,258, filed on Oct. 11, 2001.

(51) Int. Cl.[7] .................... A44B 13/02; F16G 11/00; F16G 17/00
(52) U.S. Cl. ................ 24/599.6; 24/599.1; 24/600.9; 24/598.6
(58) Field of Search ................ 24/599.6, 598.6, 24/600.9, 601.3, 599.1, 599.2; 294/82.19

(56) References Cited

U.S. PATENT DOCUMENTS

| | | | |
|---|---|---|---|
| 1,356,830 A | * 10/1920 | Rohrbach | 24/599.9 X |
| 1,557,603 A | * 10/1925 | Morrett | 24/600.9 X |
| 1,709,235 A | 4/1929 | Shaffer | |
| 1,875,274 A | * 8/1932 | Soule | 24/600.9 |
| 3,273,928 A | 9/1966 | Wisniewski | |
| 4,013,314 A | 3/1977 | Archer | |
| 5,127,219 A | 7/1992 | Herron et al. | |
| 5,480,202 A | 1/1996 | Gloden | |
| 5,577,787 A | 11/1996 | Klope | |
| 5,664,304 A | 9/1997 | Tambornino | |
| 5,704,668 A | * 1/1998 | Ferrato | 294/19.1 |
| 5,878,834 A | * 3/1999 | Brainerd et al. | 182/3 |
| 5,913,479 A | 6/1999 | Westwood, III | |
| 5,937,490 A | 8/1999 | Mihailovic | |

* cited by examiner

*Primary Examiner*—Robert J. Sandy
(74) *Attorney, Agent, or Firm*—Robert C. Freed; Moore, Hansen & Sumner, PLLP

(57) ABSTRACT

The present invention is a safety hook (12, 12') having a wire spring latch (26, 26'). The wire spring latch (26, 26') is a wire loop pawl. The safety hook (12, 12') is made of a heavy gauge wire form material, which is preferably bent only to form first and second ends (14, 14', 16, 16'), a chain link securing end (14, 14') and a hook opening end (16, 16'), respectively. The wire loop pawl (26, 26') is preferably a rod of elastically deformable material, bent to form an open loop (28, 28') and bent-over ends (32, 32', 34, 34') about which the pawl (26, 26') pivots with respect to the body (12, 12") of the safety hook (10, 10') when the latch (26, 26') is deformed and forced away from a distal end (38, 38') of the hook opening end (16, 16') of the safety hook (10,10'). The bent over ends (32, 32', 34, 34') of the wire loop pawl (26, 26') are not coaxial. The wire loop pawl (26, 26') may be deformed in such a way as to open the safety hook (10, 10'), but the latch (26, 26') is heavily spring biased up against an inside (37, 37') of the distal end (38, 38') of the safety hook (10, 10').

11 Claims, 3 Drawing Sheets

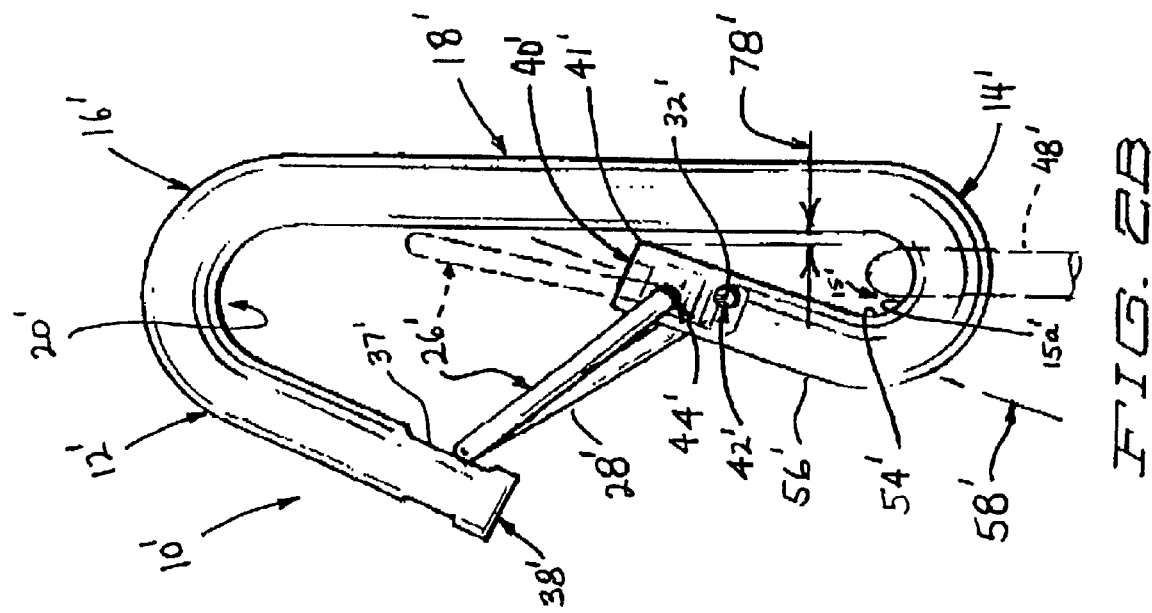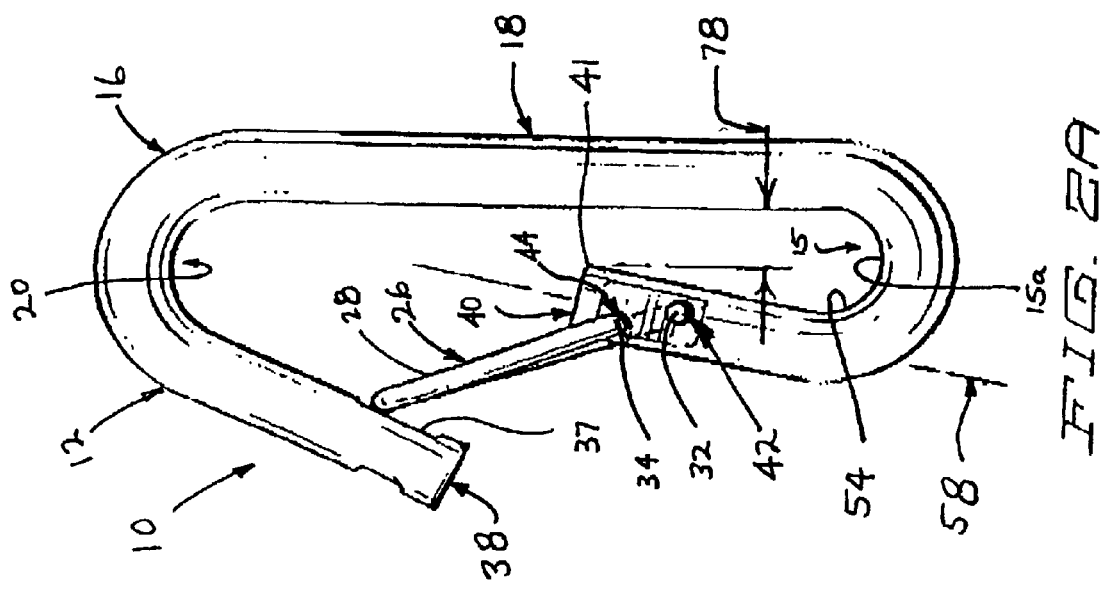

WIRE SPRING LATCH SAFETY HOOK

RELATED APPLICATIONS

The present application claims priority to pending U.S. patent application Ser. No. 60/329,258 for WIRE SPRING LATCH SAFETY HOOK filed Oct. 11, 2001.

BACKGROUND OF THE INVENTION

The present invention relates to hooks, and, more particularly, to safety hooks which are used to attach a chain to another object; the safety hook having a safety latch over the hook opening which receives the object to which the hook is attached. The safety latch is generally designed to prevent the hook from becoming unintentionally disengaged from the object. For example, a safety chain on a trailer towed behind a motor vehicle is generally used to secure the trailer to the vehicle as a safety measure in case the trailer hitch becomes disengaged. The safety chains are generally secured to the under carriage of the vehicle using safety hooks having a safety latch.

Hooks have been used for years to attach chains to other objects. However, the wire formed or bent safety hooks having latches have not been manufactured with the simplicity one might employ to reduce costs and process steps, or so that the safety hook can easily accept a chain link through the chain link receiving opening. Accordingly, a new design of a safety hook is needed which will avoid these problems and provide a safety hook which can be easily attached to a chain without requiring a further attachment device and which has a simple design which is inexpensively produced.

It will be appreciated from the foregoing, therefore, that prior art devices and methods of making and using these devices present problems that are in need of solutions. It also will be appreciated that further enhancements of the cost effectiveness of the present invention and methods for making the same will provide needed efficiencies for consumers and manufacturers alike. The present invention provides solutions for these and other problems.

SUMMARY OF THE INVENTION

The present invention provides a safety hook having a wire spring latch. The wire spring latch 26 is a wire loop pawl. In preferred embodiments, the safety hook is made of a heavy gauge wire form material, which is preferably bent only in two places to form first and second ends, a chain link securing end and a hook opening end, respectively. The wire loop pawl is preferably a rod of elastically deformable material, bent to form an open loop and bent-over ends about which the pawl pivots with respect to the body of the safety hook when the latch is deformed and forced away from a distal end of the hook opening end of the safety hook. The bent over ends of the wire loop pawl are not coaxial. Each is inserted into one of two spaced apart apertures in the proximal end of the chain link securing end of the safety hook. In this way, the bent-over ends of the wire loop are kept in spaced-apart positions in which they are situated a distance from one another, thereby preventing pivoting with respect to the body of the safety hook, unless the wire loop is deformed. The wire loop may be deformed in such a way as to open the latch, but the latch is heavily spring biased up against an inside of the distal end of the chain opening end of the safety hook. The chain link securing end of the safety hook can receive a chain of the same thickness of material within the chain link securing end, and does not require any further attachment mechanism to attach to a chain. Once the chain link is received within the chain link securing end, the proximal end of the chain link securing end can be further bent or crimped to close the chain receiving opening between the proximal end of the chain link securing end and the closed side of the safety hook opposite the latch, thereby narrowing the chain receiving opening such that a chain link within the chain link securing end cannot be removed without deforming the safety hook.

In another embodiment of the present invention, a method of making a safety chain having a safety hook, the safety chain having a chain including at least one chain link is provided. In the preferred embodiment, the method includes the steps of providing a safety hook having: a continuous, unitary hook body formed from an elongated material generally having a uniform thickness; the hook body including first and second ends joined together by a generally straight section. The first end is a chain link securing end having a first turn section which interconnects the straight section with a proximal end which is angled generally back toward the straight section. The hook body has a chain link receiving opening between the straight side and the proximal end, wherein the distance between the straight side and the proximal end is greater than the thickness of the material of the hook body. The second end of the hook body has a second turn section extending away from the straight section and providing a curved hook portion including a distal end. The proximal end preferably has first and second spaced-apart wire receiving apertures. A wire spring latch is pivotally connected to the proximal end. The latch includes a wire form loop having two bent-over ends. The respective bent-over ends are pivotally engaged within the respective spaced-apart wire receiving apertures in the proximal end and the chain link receiving end has a gap between the straight section and a tip of the proximal section. The preferred method further including placing the chain link within the chain link securing end and crimping the proximal end toward the straight section such that the gap between the straight section and the tip of the proximal end is smaller than the thickness of the material.

In further embodiments of the present method, the step of providing a safety hook includes bending a length of standard wire form material to form the continuous, unitary hook body and further includes a step of bending a rod of elastically deformable wire form material to form the latch. In further embodiments, the step of providing a safety hook, further includes engaging the bent-over ends of the latch within the respective spaced-apart wire receiving apertures.

It will be appreciated that an object of the present invention is to provide an inexpensive safety latch which is made with great simplicity, and, therefore, at a reduced cost to the manufacturer.

It is a further object of the present invention to provide a safety latch wherein the latch is biased toward a closed position. It is a further object to provide a latch which is spring biased toward the closed position. It is yet another object of the present invention to provide a hook body which is easily engaged with a safety chain and manipulated to secure the safety chain within the chain link securing end of the hook body in order to prevent the safety hook from disengaging from the safety chain over time.

The above-described features and advantages along with various other advantages and features of novelty are pointed out with particularity in the claims annexed hereto arid forming a part hereof. However, for a better understanding of the invention, its advantages and objects attained by its

BRIEF DESCRIPTION OF THE DRAWINGS

Referring now to the drawings, in which like reference numerals refer to equivalent elements in a series of embodiments of the present invention:

FIG. 2A is a rear elevation of the safety hook of FIG. 1 before the chain link securing end is crimped;

FIG. 2B is a rear elevation of the safety hook of FIG. 1 after the chain link securing end is crimped;

DETAILED DESCRIPTION OF THE PREFERRED EMBODIMENTS

Figure 1:
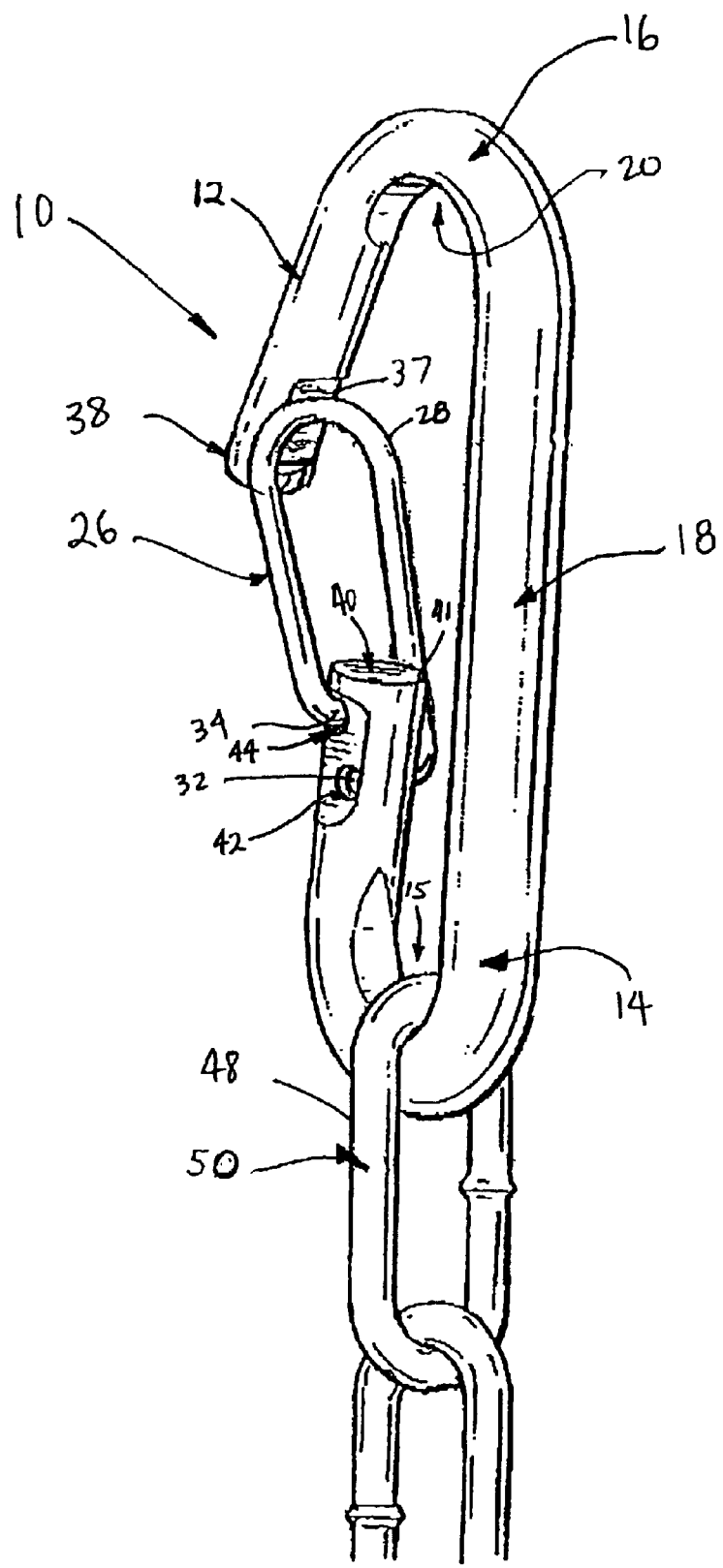
FIG. 1 is a perspective view of the safety hook of the present invention before the chain link securing end is crimped to secure the chain link received in the chain link securing end.
Figure 3D:
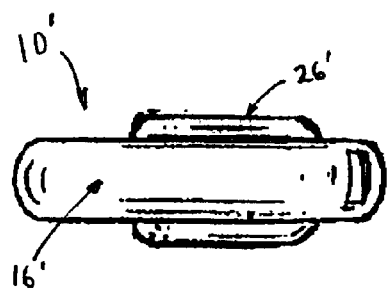
FIG. 3D is a top side elevation of the safety hook of FIG. 1 after the chain link securing end is crimped.
Figures 3A, 3B, 3C:
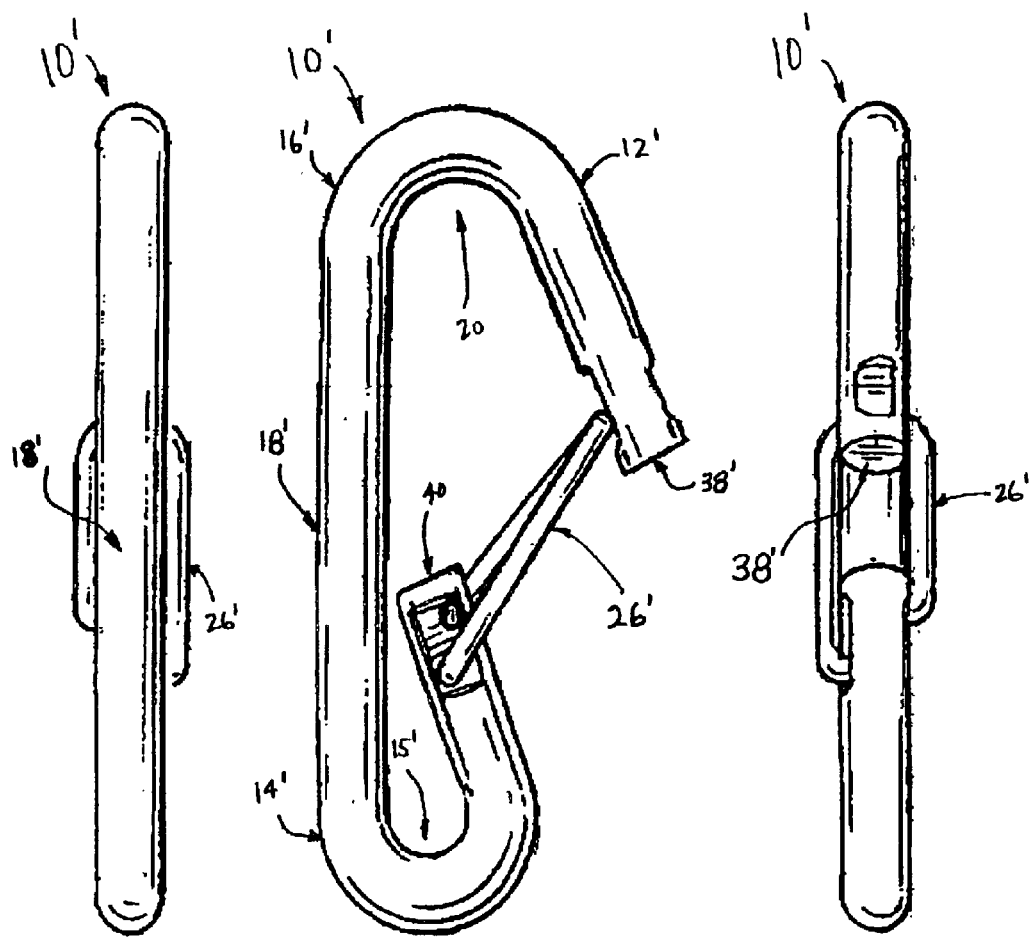
FIG. 3A is a front elevation of the safety hook of FIG. 1 after the chain link securing end is crimped.
FIG. 3B is a right side elevation of the safety hook of FIG. 1 after the chain link securing end is crimped.
FIG. 3C is a left side elevation of the safety hook of FIG. 1 after the chain link securing end is crimped.
Figure 3E:
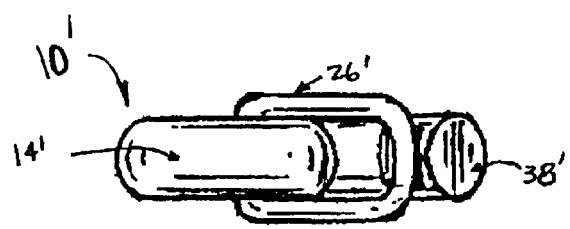
FIG. 3E is a bottom side elevation of the safety hook of FIG. 1 after the chain link securing end is crimped.

Referring now to the drawings, and to FIGS. 1 and 2A, a preferred embodiment of an uncrimped safety hook 10 of the present invention is shown. The uncrimped safety hook has an uncrimped hook body 12 having first and second ends, 14 and 16, and a wire spring safety latch 26. The uncrimped hook body 12 is preferably made of wire form materials commonly used in the industry. As shown in FIGS. 1 and 2A, the uncrimped hook body is a preliminary product which is preferably made using commonly used wire form bending and crimping techniques and the like. This preliminary product is made in anticipation of engaging an elongated strand (not shown) of weight bearing material such as a chain 50, a wire (not shown), a multi-strand wire cable (not shown), a rope (not shown) or the like, although the present uncrimped safety hook 10 is preferably envisioned to be used with a chain intended to either tow vehicles or to provide a safety link between a vehicle and a drawn trailer or other such drawn equipment. To provide a completed product for actual use, an end of the elongated strand, preferably an individual chain link 48 at one end of a length of chain 50 is engaged in the first end 14 of the uncrimped hook body 12 and the hook body is crimped to secure the chain link 48 within the first end 14 of the hook body 12.

Referring now also to FIG. 2B, a completed safety hook 10' is shown in which the completed hook body 12' has been crimped to prevent the link 48 (shown in phantom) from disengaging from the first end 14' of the crimped hook body 12'.

The first end 14 or chain link securing end 14 of the uncrimped hook body 12, includes a first turn, which extends into a straight section 18 or a closed side 18. The closed side 18 further extends away from the first turn 15 into a second turn 20, or hook turn 20, in the second end 16, or hook opening end 16. The uncrimped hook body 12 continues to extend around the hook turn 20 into a distal end 38 which is preferably a generally straight end as the wire form material of the hook body extends out of the hook turn 20. As the wire form material of the uncrimped hook body 12 is traced back from the distal end 38 through the hook turn 20 of the second end, or hook opening end 16, through the straight section 18 or closed side 18 of the uncrimped hook body 12, and then through the first turn 15 of the first end 14 or chain link securing end 14, the uncrimped hook body 12 ends in a proximal end 40. The wire spring safety latch 26 is secured in two apertures, 42, 44 in the proximal end of the uncrimped hook body 12.

As the wire form material of the uncrimped hook body 12 extends from the straight section 18 into and out of the first turn 15 within the chain link securing end 14 the wire form material preferably continues around a generally circular turn radius for more than about 180°, far enough so that the proximal end 40 of the chain link securing end 14 is bent back, so that it is angled toward the straight section 18 of the uncrimped hook body 12 to leave a narrow gap 78 between the straight section 18 and a tip 41 of the proximal end 40. This gap 78 is preferably formed in such a way that the link 48 of the chain 50 or such other engaging end (not shown) of any other elongated strand (not shown) which is intended to be secured to the uncrimped safety hook 10 may be engaged with the uncrimped hook body 12 by being passed through the gap 78. In the preferred embodiment, once the link 48 is passed through the gap 78, the proximal end 40 of the uncrimped hook body 12 can be crimped against the straight section 18 to narrow the gap 78 so that the link 48 can no longer pass between the tip 41 of the proximal end and the straight section 18 of the hook body 12.

Referring now particularly to FIG. 2B, in which the preferred completed safety hook 10' is shown, it will be appreciated that the gap 78' between the tip 41' of the proximal end 40 and the straight section 18' of the crimped and completed safety hook 10' is too narrow to allow the link 48 to pass out of the first end 14'.

Referring now again to FIGS. 1 and 2A, it will be appreciated that the wire spring safety latch 26 is a wire loop pawl secured to the proximal end 40. The wire loop pawl 26 is preferably made of a rod of wire form material that is elastically deformable material, preferably an elastic, deformable metal wire material, bent to form an open loop 28 and two bent-over ends 32, 34 about which the wire loop pawl pivots with respect to the uncrimped hook body 12, when the wire spring safety latch 26 is forced inward toward the straight section 18 and away from the distal end 38 of the second end 16 or hook opening end 16 of the uncrimped hook body 12. The bent-over ends 32, 34 of the wire loop pawl 26 are not coaxial, but rather non-concentric. Each is inserted into and engaged within one of two spaced-apart apertures 42, 44 in the proximal end 40 of the uncrimped hook body 12. As is evident in the drawings, the respective apertures 42, 44 are not only spaced apart along the length of the proximal end 40, but they are also displaced side-to-side along the length of the proximal end 40, such that a first aperture 42 of the two spaced-apart apertures 42, 44 is closer than a second aperture 44 of the two spaced-apart apertures 42, 44 to a first turn surface 54 which extends generally along an inside 15a of the first turn 15. The second aperture 44, on the other hand, is closer to a second surface 56, opposite of the first turn surface 54, with respect to the proximal end 40 as shown in FIG. 2A. When the proximal end 40 is crimped as discussed above, so that the proximal end 40', as shown in FIG. 2B, is closer to the straight section 18' than it was before, and the gap 78' is narrowed from the gap 78 shown in FIG. 2A. Also, the first and second apertures 42, 44, although spaced apart from side-to-side with respect to an axis 58 of the proximal end 40.

When the proximal end 40 is crimped to take the position of the proximal end 40', shown in FIG. 2B, and to narrow the gap 78' to secure the link 48' within the chain link securing end 14', the respective first and second apertures 42', 44' are generally positioned equidistant from the straight section 18' and the wire look pawl 28' is believed to remain forcefully biased against an inside surface 37' of the distal end 38' of the crimped hook body 12'.

In order to open the completed wire spring latch safety hook 10' to permit entry past the wire spring safety latch 26, the wire loop pawl 26 must be forced away from the inside surface 37' of the distal end 38', which deforms the wire spring pawl 26' (as shown in phantom in FIG. 2B), thereby increasing the degree to which the wire spring pawl is biased toward the distal end 38'. Because the bent-over ends 32', 34' of the wire loop pawl 26' are kept in spaced-apart positions within the proximal end 41, the wire loop pawl or wire spring safety latch 26 is prevented from pivoting with respect to the completed hook body 12' of the safety hook 10', unless the wire loop 28' is deformed because the wire loop pawl 26 is preferably made from a deformable, but elastic, wire form material, the wire spring safety latch 26' will be biased toward the distal end 38' when it is sufficiently pivoted with respect to the completed hook body 12' to open the safety hook end 16' in the manner shown in phantom in FIG. 2B. The wire loop 28' may be deformed in this way, so as to open the latch 26', but the latch 26' will be heavily spring-biased toward the inside 37' of the distal end 38'.

Further reference is now made to FIGS. 2B–3E, in which several views of a safety hook 10' of the type shown in FIGS. 1–2B, where the chain link receiving end 14' has been further crimped to narrow the gap 78' between the proximal end 40' and the closed side 18' so as to secure the chain link 48 (shown in phantom in FIG. 2B).

In preferred embodiments, the hook body 12 is preferably formed of a unitary piece of material having a generally uniform, circular cross-section of 3/8", 5/16" or 1/4" diameter. The unitary piece of material is preferably a die formed into the shape shown. Regardless of the diameter or cross-sectional shape of the hook body 12, the chain opening distance 78 should be as large or larger than the thickness of the material for hook body 12. This allows the hook 10 to receive a link 48 of chain 50 of similar size and thickness to the material for hook body 12. The hook body 12 and the latch 26 are all preferably formed of zinc plated steel. Hook body 12 and latch 26 are preferably heat treated for strengthening.

It is to be understood that, even though numerous characteristics and advantages of various embodiments of the present invention have been set forth in the foregoing description, together with details of the structure and function of various embodiments of the invention, this disclosure is illustrative only, and changes may be made in detail, especially in matters of shape, size and arrangement of parts, within the broad principles of the present invention, to the full extent indicated by the broad general meaning of the terms in which the appended claims are expressed.

What is claimed is:

1. A safety hook for attachment to a link of a chain and to engage an exterior body, the safety hook comprising:
    a hook body unitarily formed of material having a thickness which is generally uniform, the hook body including first and second ends and a closed side interconnecting the respective first and second ends, the first end being a chain link securing end having a proximal end and a first chain turn extending from the proximal end to the closed side and turning to provide a first curved portion of the hook body to engage the link of the chain when the safety hook is attached thereto; the second end being a hook opening end having a second chain turn extending from the closed side to a distal end of the hook opening end and turning from the closed side to provide a second curved portion of the hook body for attachment to the exterior body; the hook body having a chain link receiving opening between the closed side and the proximal end, wherein a distance between the closed side and the proximal end is greater than the thickness of the material of the hook body;
    wherein the distal end of the hook opening end extends at an angle away from the closed side;
    a wire spring latch pivotally connected to the proximal end of the first end, the latch having a closed position and an open position, wherein the latch extends from the proximal end of the hook body to an inside of the distal end when the latch is in the closed position; the latch being biased toward the closed position.

2. The safety hook of claim 1, wherein the proximal end extends away from the first chain turn and toward the closed side.

3. A safety hook for attachment to a link of a chain, the safety hook comprising:
    a hook body; the hook body having a latch including a rod of elastically deformable material, bent to form an open loop and two bent-over ends about which the loop pivots with respect to the body when the loop is deformed; the hook body being unitarily formed of material having a thickness which is generally uniform, the hook body including first and second ends interconnected by a closed side, the first end being a chain link securing end having a proximal end and a first chain turn extending from the proximal end of the chain link securing end to the closed end side and turning to provide a first curved portion of the hook body to engage the link of the chain; the hook body having a chain link receiving opening between the closed side and the proximal end, wherein a distance between the closed side and the proximal end is greater than the thickness of the material of the hook body; wherein the proximal end extends away from the first chain turn and at an angle toward the closed side; the second end extending from the closed side and turning from the closed side to a provide a second curved portion of the hook body for attachment to the exterior member; the second curved portion interconnecting the closed side to a distal end extending outwardly at an angle that extends away from the closed side, thereby forming the second end; the second end being a hook opening end; the latch being shaped such that the bent-over ends are normally kept in a spaced-apart position in which they are situated some distance from one another in order to bias the latch toward a closed position in which the latch is biased against the distal end, the hook body further defining two spaced-apart apertures in each of which one of the two bent-over ends is engaged; the latch being deformable in such a way as to allow the loop to pivot with respect to the hook body when the loop is deformed.

4. A safety hook for attachment to a link of a chain, the safety hook comprising:
    a continuous, unitary hook body formed from an elongated material generally having a uniform thickness, the hook body including first and second ends joined together by a generally straight section, the first end being a chain link securing end; the chain link securing end having a first turn section which interconnects the straight section with a proximal end which is angled generally back toward the straight section; the chain link securing end extending from the proximal end and then turning to provide the first turn section interconnecting the proximal end to the straight section; the hook body having a chain link receiving opening between the straight section and the proximal end, wherein a distance between the straight section and the proximal end is greater than the thickness of the material of the hook body; the second end of the hook body having a second turn section extending away from the straight section and providing a curved hook portion interconnecting the straight section to a distal end that extends away from the straight section at an angle; wherein the proximal end has first and second spaced-apart wire receiving apertures; and a wire spring latch pivotally connected to the proximal end of the chain link securing end of the hook body; wherein the latch is a wire form loop having two bent-over ends, the respective bent-over ends being pivotally engaged within the respective spaced-apart wire receiving apertures; the latch having a closed position and an open position, the latch being spring biased up against the distal end of the second end when it is in the closed position and being deformed when the latch is in an open position such that the latch is spring biased toward the closed position when it is in the open position.

5. The safety hook of claim 4, wherein the hook proximal end extends away from the first chain turn and toward the straight section.

6. The safety hook of claim 4, wherein the latch is made of a rod of elastically deformable material, bent to form an open loop and the two respective bent-over ends about which the loop pivots with respect to the hook body when the latch is moved from the first position to the second position, thereby deforming the loop.

7. The safety hook of claim 4, wherein the first turn section has a turn radius of greater than 180 degrees.

8. The safety hook of claim 4, wherein the safety hook is made of plated steel and the proximal end and the straight section can be crimped together so that the distance between the straight section and the proximal end is smaller than the thickness of the material.

9. A method of making a safety chain having a safety hook, the safety chain having a chain including at least one chain link; the method comprising the steps of:

providing a safety hook having a continuous, unitary hook body formed from an elongated material generally having a uniform thickness; the hook body including first and second ends joined together by a generally straight section, the first end being a chain link securing end; the chain link securing end having a first turn section which interconnects the straight section with a proximal end which is angled away from the first turn section and generally back toward the straight section; the hook body having a chain link receiving opening between the straight side and the proximal end, wherein a distance between the straight side and the proximal end is greater than the thickness of the material of the hook body; the second end of the hook body having a second turn section extending away from the straight section and providing a curved hook portion interconnecting the straight section with a distal end; wherein the proximal end has first and second spaced-apart wire receiving apertures;

providing a wire spring latch pivotally connected to the proximal end of the chain link securing end of the hook body; wherein the wire spring latch is a wire form loop having two bent-over ends, the respective bent-over ends being pivotally engaged within the respective spaced-apart wire receiving apertures; the wire spring latch having a closed position and an open position, the wire spring latch being spring biased against the distal end of the second end when the wire spring latch is in the closed position and spring biased toward the closed position when the wire spring latch is in the open position; wherein the chain link receiving end has a gap between the straight section and the proximal end;

placing the chain link within the chain link securing end; and crimping the proximal end toward the straight section such that the gap between the straight section and the tip of the proximal end is smaller than the thickness of the material.

10. The method of claim 9, wherein the first turn section has a turn radius of greater than 180 degrees prior to the step of placing the chain link within the chain link securing end; and wherein the step of crimping the proximal end toward the straight section includes increasing the degree of the turn radius of the first turn section.

11. The method of claim 9, wherein the distal end extends at an angle away from the second turn and away from the straight section such that the step of crimping increases a distance between the proximal end and the distal end.

* * * * *